Inventors
Henry Seiwatz
Carl M. Groom

Attorney

Inventors
Henry Seiwatz
Carl M. Groom
Attorney

United States Patent Office 3,448,377
Patented June 3, 1969

3,448,377
METHOD UTILIZING AN ELECTRON BEAM FOR NONDESTRUCTIVELY MEASURING THE DIELECTRIC PROPERTIES OF A SAMPLE
Henry Seiwatz, Oak Park, and Carl M. Groom, Chicago, Ill., assignors to the United States of America as represented by the United States Atomic Energy Commission
Filed Oct. 12, 1967, Ser. No. 674,989
Int. Cl. G01r 31/12
U.S. Cl. 324—54         5 Claims

ABSTRACT OF THE DISCLOSURE

A method for nondestructively measuring the dielectric properties of a sample includes an electron gun whose beam is scanned across a surface on one side of the sample and a grid spaced from the scanned surface to collect emitted secondary electrons from the scanned surface, whereby equilibration between transmitted primary electrons and secondary electrons is achieved and an equipotential surface for the sample is effected. A negative high voltage is applied to an electrode electrically-conductively mounted to the surface of the opposite side of the sample and the induced charge on the said electrode is measured to obtain a value of the dielectric properties of the sample.

CONTRACTUAL ORIGIN OF THE INVENTION

The invention described herein was made in the course of, or under, a contract with the United States Atomic Energy Commission.

BACKGROUND OF THE INVENTION

This invention relates to methods for measuring the dielectric properties of a sample and more particularly to methods using an electron beam to measure the dielectric properties of a sample.

To use a material in the electrical art it is necessary to know the dielectric properties of the material. These properties are the conductivity of the material, the dielectric constant of the material and the ability of the material to withstand an applied voltage without electrical breakdown. The dielectric properties of a sample are presently determined by mounting an electrode on one side of the sample and a guarded electrode on the opposite side of the sample. With a voltage applied between these electrodes the dielectric properties of the material of the sample are determined. However, when using these structures to determine the ability of the sample to withstand an applied voltage, electrical breakdown causing destruction of the sample is occasioned. Further, when measuring the dielectric constant or conductivity of the sample, the values obtained are for an area defined by the area of the guarded electrode in contact with the sample. Thus, it is both difficult and impractical to obtain values of dielectric constant and conductivity for the sample on a point-by-point basis.

Accordingly, it is one object of the present invention to provide an improved method for measuring the dielectric properties of a sample.

It is another object of the present invention to provide a method using an electron beam for measuring the dielectric properties of a sample.

It is another object of the present invention to provide a method for measuring the dielectric properties of a sample on a point-by-point basis.

It is still another object of the present invention to provide a method for nondestructively measuring the dielectric properties of a sample.

Other objects of the present invention will become more apparent as the detailed description proceeds.

SUMMARY OF THE INVENTION

In general, the method of the present invention comprises generating an equipotential charge on a surface of a sample including generating a primary electron beam incident on the surface of the sample and producing secondary electrons therefrom greater than unity to drive the surface electrically positive and collecting with a collector grid adjacent the surface secondary electrons produced by the primary electron beam to equilibrate said primary and secondary electrons. An electrode is electrically-conductively mounted to the opposite side of the sample and a voltage is applied to the electrode. The electrical charge induced on the electrode responsive to the electron beam and the electrode voltage is measured to provide a value of the dielectric properties of the sample.

BRIEF DESCRIPTION OF THE DRAWINGS

Further understanding of the present invention may best be obtained from consideration of the accompanying drawings wherein:

FIG. 5 is a graphical plot of voltage versus current for a typical material.

In FIG. 1 the sample 10 whose dielectric properties are to be determined is mounted within a partially evacuated chamber 12. An electrode 14 is electrically-conductively attached to one side of the sample 10. A power supply 16 has an output thereof connected to the electrode 14 to supply a high voltage thereto. An electron gun 18 is mounted within the chamber 12 so as to transmit the electron beam output therefrom to the surface 15 of sample 10 opposite the surface 17 attached to electrode 14. The potentials requisite for operation of the electron gun 18 are supplied by the power supply 16. Two pairs of electrodes 20 and 22 are disposed between the electron gun 18 and the sample 10 to provide vertical and horizontal deflection, respectively, of the electron beam output of electron gun 18. The driving voltages for deflection electrodes 20 and 22 are provided by a conventional raster sweep generator 24 which, in turn, is provided with voltage from power supply 16. A collector grid 26 is mounted between the deflection electrodes 20 and 22 and the sample 10. A four-channel recorder 28 records simultaneously the vertical sweep signal applied to the vertical electrodes 20, the horizontal sweep signal applied to the horizontal electrodes 22 and the induced charge on electrode 14 as measured by a meter 27.

Figure 1:
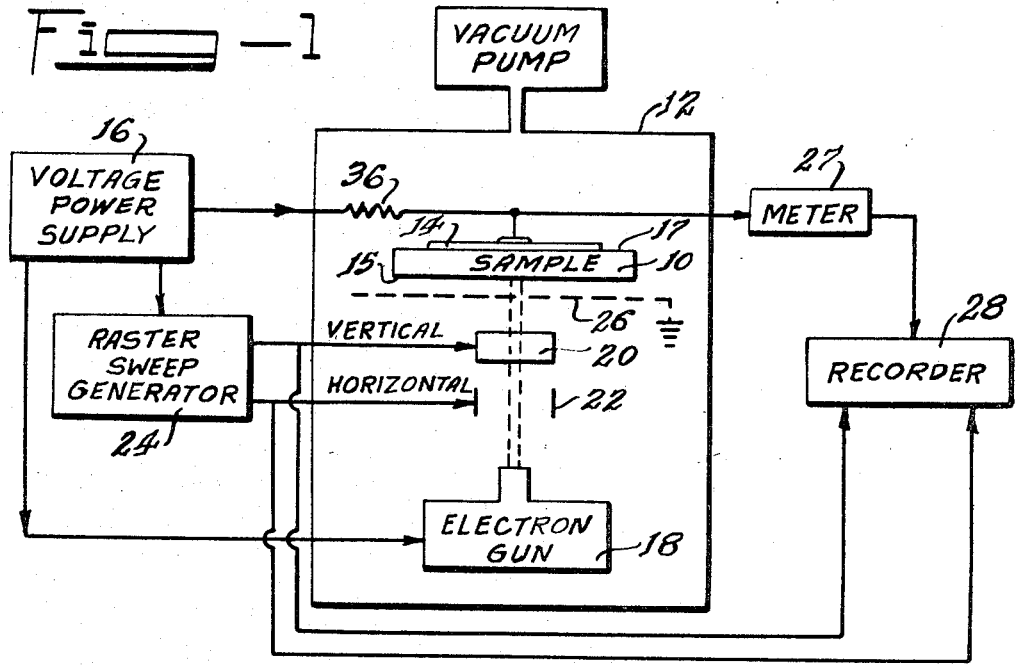
FIG. 1 is a schematic drawing of an embodiment for the practice of the present invention.

Using the embodiment illustrated in FIG. 1, the dielectric properties of the sample 10 may be determined in the following manner.

With the electrode 14 at zero volts potential and the surface 15 of sample 10 adjacent the electron gun 18 also at zero volts potential, the electron gun 18 is energized together with the deflection plates 20 and 22 so that a narrow beam of primary electrons is generated and scanned across the surface of sample 10 in a raster. As the primary electrons from the gun 18 strike the surface 15 of the sample 10, they cause to be emitted therefrom secondary electrons greater than unity and cause the surface 15 of the sample 10 to become slightly positive in potential. The collector grid 26, maintained at ground potential, collects the secondary electrons until equilibration between the secondary electrons and primary electrons from gun 18 occurs. At this time, with a complete raster sweep over the surface 15 of sample 10, an equipotential surface 15 is achieved for the side of the sample 10 adjacent the electron gun 18.

With the equipotential surface 15 of sample 10 slightly positive electrically, a negative voltage from power supply 16 is applied to the electrode 14. Upon application of the negative voltage to electrode 14, the previously charged surface 15 of sample 10 will attempt to follow the negative polarity of electrode 14, thereby causing an increase in the number of secondary electrons collected by collector grid 26. The increase in secondary electron collection by collector grid 26 results in an unbalance between the number of primary electrons emitted by the electron gun 18 and the number of secondary electrons collected by collector grid 26. This unbalance will continue until equilibration therebetween is again achieved, at which time the surface 15 of the sample 10 adjacent the electron gun 18 will return to the original equipotential state but with a negative potential applied to the electrode 14.

With the surface 15 of the sample 10 adjacent the electron gun 18 in an equipotential condition and a negative voltage applied to electrode 14, a particular point on the surface 15 of the sample 10 being swept by the electron beam will start, upon departure therefrom of the electron beam, to leak charge to the electrode 14. The rate of leakage of charge from the surface 15 of the sample 10 to the electrode 14 is dependent upon the conductivity of the sample. It is to be noted that the electron beam from electron gun 18 sweeps across the surface 15 of the sample 10 in a raster and the electron beam thereby repetitively encounters a given point on the surface of the sample being swept. The time interval $\Delta T$ that elapses between the electron beam encountering the same point is equal to the period of the raster. Thus, with a continuous sweep, for a particular point after the departure of the electron beam from electron gun 18, there elapses a time $\Delta T$ during which leakage may occur from the particular point to the electrode 14. Any such leakage of charge will be replaced upon return of the electron beam at the later time $\Delta T$ to reestablish equilibration between the primary and secondary electrons. This replacement charge, $\Delta Q$, is measured by the meter 27 and recorded on one channel of recorder 28.

Figure 2:
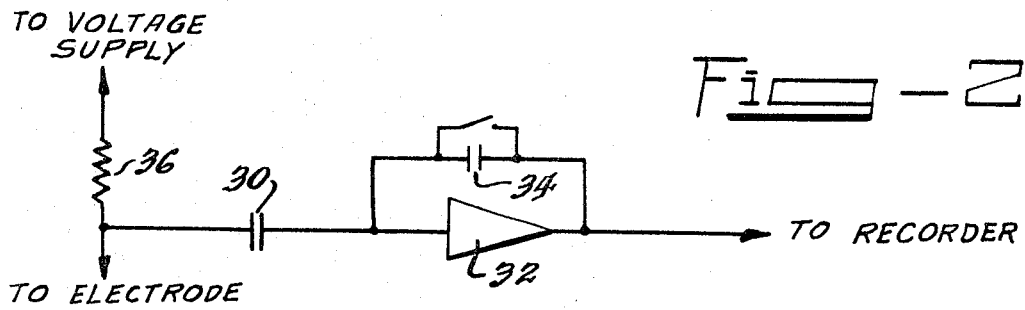
FIG. 2 is a detailed schematic drawing of a portion of the apparatus of FIG. 1.

The meter 27 is shown in detail in FIG. 2 and basically comprises a large blocking capacitor 30, an operational amplifier 32 having a capacitor 34 connected thereacross. The time constant RC of capacitor 30 and resistor 36 should be greater than the time required for an equilibration of the primary and secondary electrons at the surface 15 of the sample 10. The value of $\Delta Q$, the output voltage from the operational amplifier 32, is fed to one channel of recorder 28 where it is simultaneously recorded along with the sweep voltages of the deflection electrodes 20 and 22 for the electron beam of electron gun 18.

Knowing the sweep time $\Delta T$ of the raster scan of the electron beam from electron gun 18, the leakage current flowing through the sample 10 at the aforedescribed point may be readily determined from the equation $I=\Delta Q/\Delta T$, which current is a function of conductivity. The actual value of conductivity may be determined from the formula conductivity$=IL/EA$, where I=the aforementioned current, L=the thickness of the sample between the two surfaces at the particular point, A=the cross-sectional area of the electron beam at the particular point and E=the voltage across the sample 10. Thus, the conductivity of the sample 10 may be ascertained for a particular point on the surface of the sample. It is to be appreciated that, since the beam from electron gun 18 sweeps across the surface 15 of the sample 10 and the sweep voltages generating the raster scan of the electron beam are simultaneously recorded with the output of the meter 27, correlation between a desired point and the output of the meter 27 may easily be determined so that conductivity measurements for any particular point on the surface of the sample 10 may be readily achieved.

Figure 3:
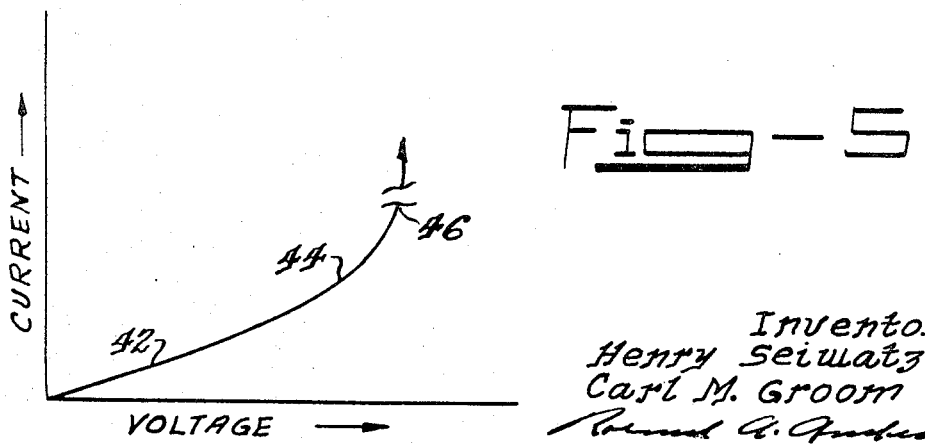
FIG. 3 is a schematic drawing of an alternate embodiment of an apparatus for the practice of the present invention.
Figure 3:
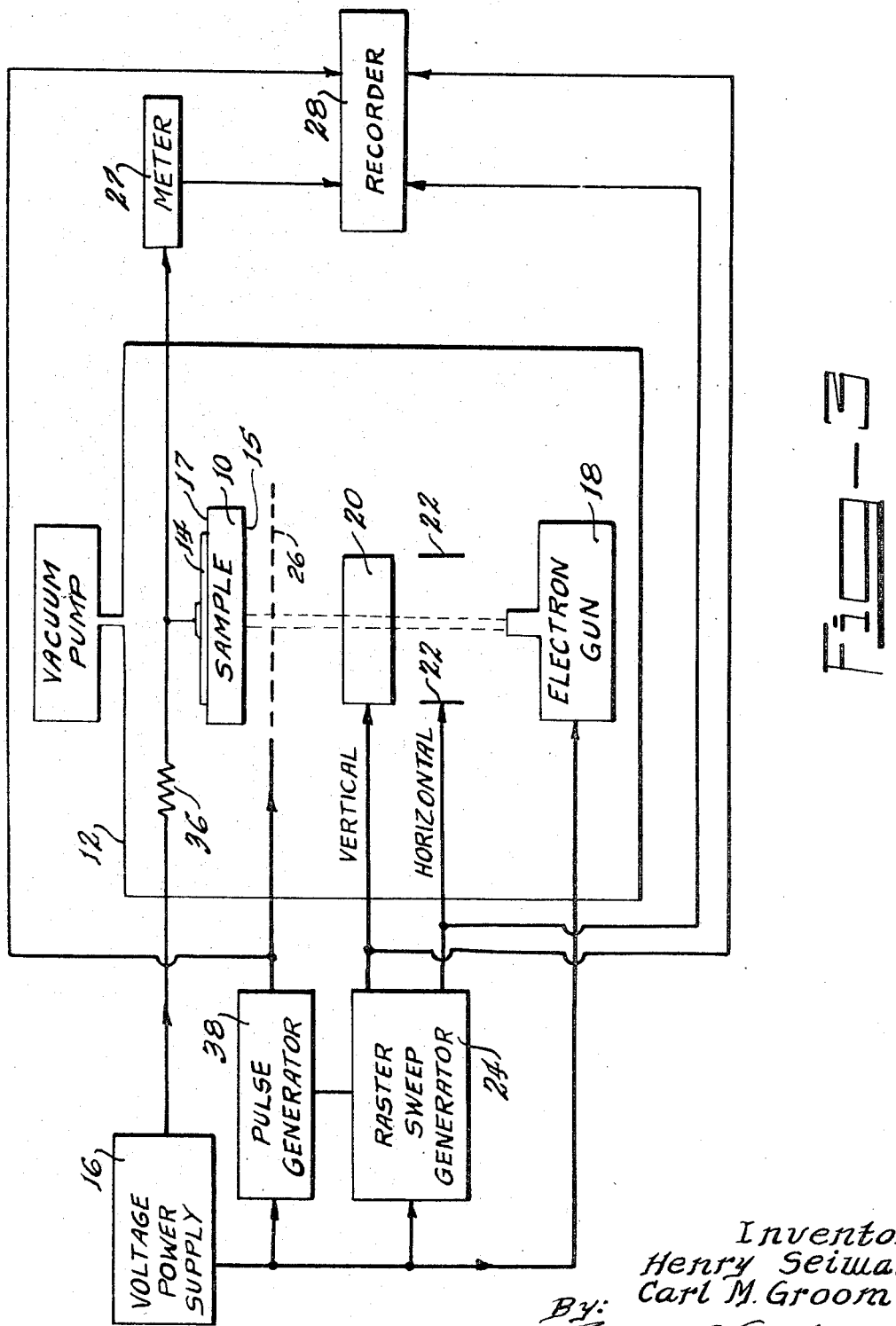

To determine the dielectric constant of the sample 10 at a particular point thereof, the same apparatus is used as for measuring conductivity, except that as shown in FIG. 3 the collector grid 26 is driven by a conventional pulse generator 38. The pulse generator 38 operates responsive to the ramp voltages of the sweep generator 24 to produce positive pulses which are applied to the grid 26 to cause the grid 26 to assume momentarily a positive bias potential as the electron beam from electron gun 18 moves across the surface 15 of the sample 10. The output pulses from pulse generator 38 are also applied to the fourth channel of recorder 28. The dielectric constant of the sample 10 at a particular point is determined by measuring the capacitance of the sample 10 at that point. The capacitance $C=\epsilon_0 KA/D$, where $\epsilon_0$ is the universal constant, K=the dielectric constant of the sample 10, D=the thickness of the sample at the point where the capacitance is being measured and A=the cross-sectional area of the electron beam at that point. Thus, the dielectric constant of the sample $K=CD/\epsilon_0 A$.

To determine the dielectric constant K of the sample 10 at a particular point, the electron gun 18 is energized to provide an equipotential surface 15 on one side of the sample 10 and the negative potential from voltage source 16 is applied to electrode 14 as hereinbefore described for the method of measuring conductivity. At this time the pulse generator 38 is energized synchronously with the raster sweep generator 24 to change temporarily the potential on collector grid 26 by some positive incremental voltage $\Delta V$. The positive incremental change of potential on collector grid 26 causes an increase in the secondary electrons being collected and correspondingly an increase in the potential of the surface 15 of sample 10 whereby equilibration between primary and secondary electrons is established. This temporary change in potential on the surface 15 of sample 10 with the electrode 14 held at a constant voltage causes a change in potential between the surface 15 and electrode 14 of magnitude $\Delta V$ and results in a charge $\Delta Q$ which is measured and recorded on recorder 28.

The capacitance at the particular point may then be determined from the formula capacitance$=\Delta Q/\Delta V$, where $\Delta Q$ is the $\Delta Q$ measured by meter 27 and $\Delta V$ is the amplitude of the voltage pulse applied to the collector grid 26, both being recorded by recorder 28. The value of this capacitance may then be substituted in the aforedescribed formula to determine the dielectric constant of the sample 10 at the particular point. It is to be noted that, since the pulse generator 38 is synchronized with the raster sweep generator 24 and the outputs of both simultaneously recorded with the output of meter 27, correlation between a desired point on the surface 15 of sample 10 may easily be made so that dielectric constant measurements on a point-by-point basis for the surface 15 of sample 10 may be readily achieved.

The aforedescribed methods have been found to operate satisfactorily with the electron gun producing electrons having energies of 600 volts and the voltage power supply 16 applying a negative voltage of 5 kilovolts, the value thereof depending upon the thickness and material of the sample 10. In measuring the dielectric constant of the sample 10, the pulse generator 38 was operated to give a pulsed positive potential swing to the collector grid 26 of approximately 10 volts for a duration of a few microseconds (10 to 100 microseconds). The raster scan time $\Delta T$ was operated at approximately 5 seconds, although this was varied up to 5 minutes.

The apparatus used to measure the conductivity and dielectric constant of the sample 10 may also be used to measure the ability of the sample 10 to withstand an applied voltage without electrical breakdown. However, it is not necessary to sweep the electron beam; it may be held stationary and focused to flood the surface 15 of the sample 10. Thus, an embodiment as shown in FIG. 4 is preferred.

Figure 4:
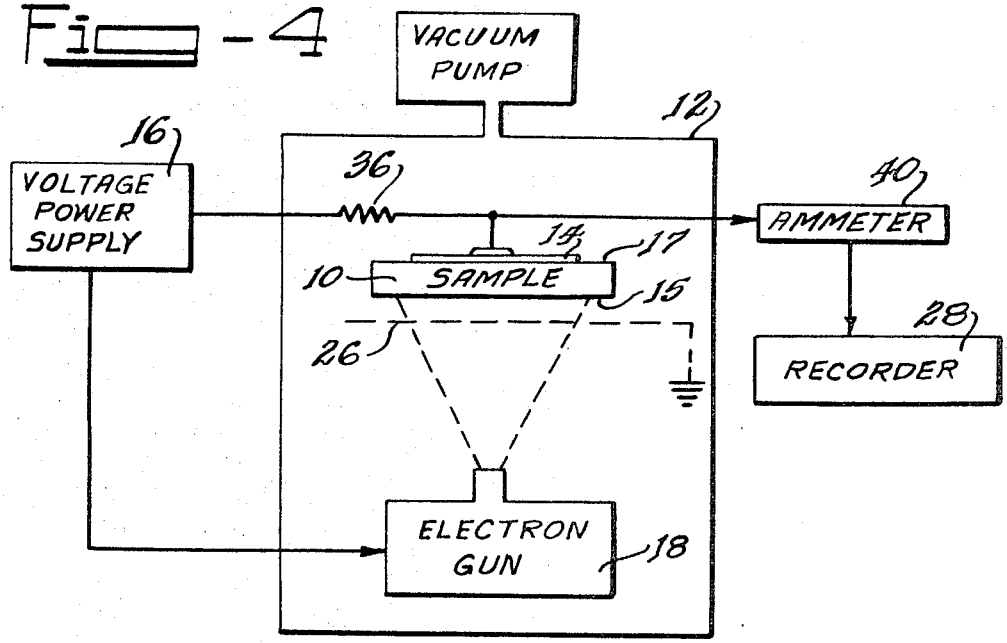
FIG. 4 is a schematic drawing of an alternate embodiment of an apparatus for the practice of the present invention.

In the embodiment of FIG. 4, the electron beam from electron gun 18 floods one side of the sample 10 to create an equipotential surface 15. Secondary emitted electrons are collected by collector grid 26 as hereinbefore described until equilibration between the secondary electrons and primary electrons is attained. A negative potential is applied to the electrode 14 from the power suply 16. An ammeter 40 is connected between the electrode 14 and one channel of recorder 28.

To determine the ability of the sample 10 to withstand an applied voltage without electrical breakdown, the electron gun 18 is energized and the electron beam therefrom floods one side of the sample 10 to generate an equipotential surface 15. The negative voltage output from power supply 16 is then gradually increased. The ammeter 40 will indicate a current as the negative voltage from power supply 16 is increased until at a particular value of applied negative voltage the ammeter will swing to zero. At this voltage value, charge leakage from the surface 15 of the sample 10 adjacent the electron gun 18 has increased to change the potential of the surface 15 such that field reversal occurs whereby the energy of the primary electrons from the electron gun 18 is insufficient to permit their arrival at surface 15. To establish if this field reversal is the actual point at which electrical breakdown of the sample 10 is occurring, the applied negative voltage from power supply 16 is reduced and removed and the current of the electron beam from electraon gun 18 is increased. The negative voltage from power supply 16 to electrode 14 is reapplied and increased until the current on ammeter 40 swings again to zero. These steps are repeated until the value of negative voltage from power supply 16 at which the ammeter indicator 40 swings to zero remains relatively constant regardless of the increased values of electron beam current. When such a voltage is obtained, the value thereof is the voltage at which electrical breakdown of the material occurs.

This may be further appreciated by reference to FIG. 5 wherein is shown a graphical representation of a voltage-current curve for a typical sample. For the portion 42 of the curve, the voltage-current correlation is relatively linear, that is, little change in the resistance of the material of the sample occurs for a corresponding increase in voltage applied thereto. At point 44 the relationship between voltage and current ceases to be linear and, as the voltage increases, the current through the material shows a marked increase until a point 46 is reached where the current through the material increases without limit for a particular applied voltage. When the indicator of ammeter 40 drops to zero for an applied voltage from source 16 independently of the current of the primary electron beam, field reversal as hereinbefore described has occurred and operation is being effected on the sample 10 at or about point 46 in the curve of FIG. 6. It is to be noted that the ammeter 40 measures the net charge being deposited on the surface 15 of the sample 10 by the combined action of the primary and secondary electrons.

It is to be understood that the ability of the sample 10 to withstand an applied voltage may be determined using the apparatus of FIG. 1. Using this apparatus, it is possible to ascertain on a point-by-point basis the ability of the sample 10 to withstand an applied voltage. Essentially the operation to determine the breakdown voltage is as described supra, where the electron beam floods the surface 15 of the sample 10. Equilibration between the primary electrons and secondary electrons is established as hereinbefore described so that an equipotential surface 15 is established for one side of the sample 10 and the voltage from power supply 16 is applied to the electrode 14 and increased. The output of the meter 27 measuring $\Delta Q$ is monitored and, as for the ammeter 40, will register until a voltage at which field reversal occurs is attained, when the meter output will fall to zero. That this voltage is the breakdown voltage for the sample 10 may be established as for the electron flood technique by reducing the voltage from power supply 16 to the electrode 14 and increasing the primary electron current from electron gun 18 and repeating the process until the applied voltage from power supply 16 remains relatively constant for increasing electron current from gun 18. This voltage value is as described before, the voltage at which electrical breakdown is occurring within the sample 10 at the point on the surface 15 thereof at which the electron beam from electron gun 18 is incident thereon.

Figure 6:
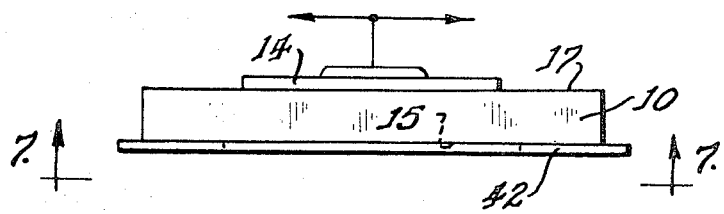
FIG. 6 is a side view of a test sample with a guard electrode.
Figure 7:
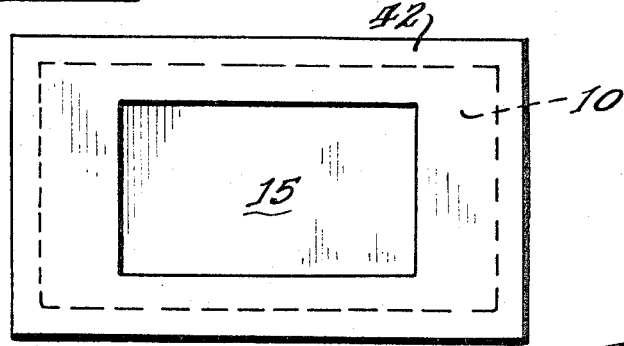
FIG. 7 is a view of FIG. 6 along lines 7—7.

For successful operation of the embodiments heretofore described, it is desirable that the area of the surface 15 scanned or flooded by the electron beam from electron gun 18 be greater than the area of the electrode 14 in contact with the surface 17 of sample 10. Further, it is desirable that the sample 10 extend beyond the boundaries of the area scanned or flooded with the electron beam from electron gun 18 an amount such that no point on the surface thereof beyond the area of the scan or electron flooding will achieve field reversal to cause deviation of the electron beam. This may be accomplished by adding to the sample an insulator about the edges thereof so as to effectively extend the surface area 15. Alternately, a guard electrode 42 may be placed on the surface 15 of the sample 10 to define the area of scan or electron flooding, which guard electrode insures that no point without the boundary of electron scanning or flooding can achieve field reversal and cause deviation of the electron beam. This construction is illustrated in FIGS. 6 and 7.

The embodiments of the invention in which an exclusive property or privilege is claimed are defined as follows:

1. A method for measuring the dielectric properties of a sample comprising:
generating an equipotential charge on a surface of said sample including generating a primary electron beam incident on said surface of said sample and producing secondary electrons therefrom greater than unity to drive said surface electrically positive and collecting with a collector grid adjacent said surface said secondary electrons produced by said electron beam to equilibrate said primary and secondary electrons;
electrically-conductively mounting an electrode to the opposite side of said sample and applying a voltage to said electrode; and
measuring electrical charge induced on said electrode responsive to said electron beam and said electrode voltage to provide a value of the dielectric properties of said sample.

2. The method of claim 1 wherein said voltage applied to electrode has a negative polarity and the value thereof is increased until said measured induced electrical charge drops to zero value, at which applied voltage value nondestructive electrical breakdown of said sample occurs.

3. The method of claim 2 wherein said primary electron beam is scanned in a raster scan over said surface of said sample to produce said equipotential charge thereon.

4. The method of claim 1 wherein said primary electron beam is scanned in a raster scan over said surface of said sample to produce said equipotential charge thereon, and measuring relative the sweep time of said primary electron beam electrical charge induced on said electrode responsive to said electron beam and said electrode voltage to provide a measure of the conductivity of said sample.

5. The method of claim 1 wherein said primary electron beam is scanned in a raster scan over said surface of said sample to produce said equipotential charge thereon, charging the potential of said collector grid to increase collection of said secondary electrons therewith while maintaining said voltage applied to said electrode, and measuring relative said changes in collector grid potential the responsive change in said electrical charge induced on said electrode to provide a measure of the dielectric constant of said sample.

References Cited

UNITED STATES PATENTS

| | | | |
|---|---|---|---|
| 2,108,132 | 2/1938 | Lora | 313—106 XR |
| 2,449,752 | 9/1948 | Ross | 313—106 XR |
| 3,051,860 | 8/1962 | Haine et al. | 250—49.5 XR |
| 3,218,505 | 11/1965 | Yaggy | 315—12 |
| 3,373,353 | 3/1968 | Harris | 324—54 |

RUDOLPH V. ROLINEC, *Primary Examiner.*

G. R. STRECKER, *Assistant Examiner.*

U.S. Cl. X.R.

315—12